United States Patent [19]

Armasow et al.

[11] 4,073,139
[45] Feb. 14, 1978

[54] HYDRODYNAMIC COUPLING

[75] Inventors: Waldemar Armasow; Hans Lindenthal, both of Heidenheim, Germany

[73] Assignee: Voith Getriebe KG, Heidenheim, Germany

[21] Appl. No.: 778,787

[22] Filed: Mar. 17, 1977

[30] Foreign Application Priority Data

Mar. 4, 1976 Germany ............................ 2614476

[51] Int. Cl.² .......................................... F16D 33/00
[52] U.S. Cl. ........................................ 60/357; 60/364
[58] Field of Search ................. 60/330, 338, 351, 352, 60/357, 364

[56] References Cited

U.S. PATENT DOCUMENTS

| 2,301,645 | 11/1942 | Sinclair | 60/365 |
| 2,875,581 | 3/1959 | Kugel | 60/360 |
| 3,178,889 | 4/1965 | Nelden | 60/351 |

FOREIGN PATENT DOCUMENTS

922,415   4/1963   United Kingdom ................... 60/357

*Primary Examiner*—Edgar W. Geoghegan
*Attorney, Agent, or Firm*—Peter K. Kontler

[57] ABSTRACT

A hydrodynamic coupling wherein the radially outermost region of the working circuit communicates with one or more radially inwardly extending channels defined by a casing which surrounds the impeller or runner element or by the casing and one of these elements. The casing has one or more openings located radially inwardly of the normal liquid level in the working circuit and in the channel or channels. These openings discharge working fluid which flows in the channel or channels radially inwardly in response to abrupt rise of fluid pressure in the working circuit as a result of abrupt change in RPM, particularly sudden acceleration of the impeller element. The outflowing fluid reduces the magnitude of transmitted torque, and the upper limit of such torque is determined by the distance between the radially outermost portion(s) of the opening(s) and the common axis of the impeller and runner elements.

17 Claims, 5 Drawing Figures

HYDRODYNAMIC COUPLING

BACKGROUND OF THE INVENTION

The present invention relates to hydrodynamic couplings, and more particulary to improvements in hydrodynamic fluid couplings of the type known as Fottinger couplings. Still more particularly, the invention relates to improvements in hydrodynamic couplings including couplings of the type wherein some fluid is continuously evacuated from the radially outermost region of and a pump or the like delivers fluid to the working chamber.

It is already known to provide a Fottinger coupling with an opening which is located close to and communicates with the radially innermost portion of the working chamber to permit evacuation of working fluid in response to increasing torque and resulting higher slip of the impeller relative to the turbine wheel or runner. In some instances, the fluid which is to leave the working chamber by way of such opening (the opening is provided in the nave or hub of the impeller or runner) is caused to flow along a suitably configurated deflector. Reference may be had to page 388 of "Motortechnische Zeitschrift" (Vol. 11, 1958) which discloses a coupling for use as a safety device in ice breakers, or to Swiss Pat. No. 337,371. When the RPM of the runner is suddenly reduced (e.g., as a result of the braking action of an obstacle which is encountered by the propeller screw of an ice breaker) and the slip of the impeller relative to the runner increases accordingly, the aforementioned opening allows for rapid evacuation of fluid from the working chamber. This results in immediate reduction of the load upon the drive. When the coupling is used under the just outlined circumstances (e.g., as a safety device between the prime mover and the propeller screw of an ice breaker), the opening invariably insures rapid evacuation of surplus fluid from the working chamber.

However, a coupling wherein the aforediscussed opening is in direct communication with the working chamber and is located close to the radially innermost portion of such chamber is not sufficiently versatile to warrant its use in other types of machines or apparatus, e.g., in a vehicle where the coupling transmits torque from the engine to a cooling fan. In such constructions, the coupling should insure that the RPM of the fan varies in dependency on the desired cooling action and also to limit the magnitude of transmitted torque. Rapid increase of slip of the impeller relative to the runner (which latter drives the fan) is not attributable to rapid deceleration of the runner but rather to rapid increase of RPM of the primer mover, i.e., to rapid increase of the RPM of the impeller, and to relatively large mass (inertia) of the rotary part or parts of the fan.

The situation is aggravated if the vehicle wherein the coupling transmits torque to a cooling fan is equipped with an automatic transmission which is designed to change speeds while under load. In such vehicles, the RPM of the engine increases very rapidly in response to shifting to another speed, i.e., the rotational speed of the impeller can rise abruptly when the driver decides to shift to a different speed ratio. The problem is especially acute when the driver shifts into a lower gear because this can result in such pronounced rise of RPM of the impeller that, when using a conventional hydrodynamic coupling, the transmitted torque temporarily rises to a value which is 4-8 times the rated value. This can result in partial or complete destruction of the coupling and is rather surprising since one of the most important characteristics of a hydrodynamic coupling is that it is capable of eliminating peaks of transmitted torque and thus constitutes a safety device against overloading of driven components.

Certain other proposals to limit the magnitude of transmitted torque include the provision of a so-called deflector which is installed in the radially innermost region of the working chamber and does not obstruct the circulation of working fluid when the slip is relatively small. When the slip increases, the deflector influences the circulation of working fluid and thereby limits the magnitude of the transmitted torque. Reference may be had to U.S. Pat. No. 2,301,645 granted Nov. 10, 1942 to Sinclair. It was further proposed to provide a so-called accumulator chamber radially inwardly of the blading of the impeller so that the accumulator chamber is in direct communication with the spaces between the blades of the runner. When the slip increases, the accumulator chamber receives some of the working fluid which is thus withdrawn from the working chamber to thereby limit the magnitude of the transmitted torque. Such feature is disclosed in U.S. Pat. No. 2,875,581 granted Mar. 3. 1959 to Kugel.

SUMMARY OF THE INVENTION

An object of the invention is to provide a hydrodynamic fluid coupling which is constructed and assembled in such a way that the torque cannot exceed a predetermined value even if the impeller is abruptly accelerated with attendant sudden rise of fluid pressure in the working chamber.

Another object of the invention is to provide a hydrodynamic coupling with novel and improved means for evacuating a certain quantity of working fluid in immediate response to abrupt acceleration of the impeller.

A further object of the invention is to provide a novel and improved impeller for use in a hydrodynamic coupling of the above outlined character.

An additional object of the invention is to provide novel and improved secondary elements for use in the above outlined coupling.

An ancillary object of the invention is to provide a hydrodynamic coupling which can be used with advantage for transmission of torque from a prime mover to a cooling fan, e.g., in automotive vehicles.

An additional object of the invention is to provide a hydrodynamic coupling which is constructed and assembled in such a way that at least some of the working fluid is rapidly expelled from the working chamber in response to abrupt changes of RPM of the impeller, especially in response to abrupt acceleration of the impeller.

The invention is embodied in a hydrodynamic fluid coupling which comprises coaxial rotary bladed impeller and runner elements defining a toroidal working chamber for working fluid (e.g., water or oil) which transmits torque from the impeller element to the runner element. The chamber has a radially outermost region, and the magnitude of transmitted torque depends on the degree of filling of the chamber with fluid. The torque increases in response to increasing ratio of RPM of the impeller element to RPM of the runner element whereby the pressure of fluid which circulates in the chamber increases abruptly as a result of abrupt change of the RPM ratio, particularly as a result of sudden increase of RPM of the impeller element. The coupling further comprises a casing element having at least one section or wall which is rigid with one of the impeller and runner elements and surrounds the other of the impeller and runner elements. At least one of the elements including the casing element and the other element defines a compartment which communicates with the outermost region of the working chamber so that the liquid level in the compartment normally equals the liquid level in the working chamber but the liquid level in the compartment advances toward the common axis of the impeller and runner elements in response to abrupt rise of fluid pressure in the working chamber. The coupling (preferably the casing element) has at least one opening which communicates with the compartment radially inwardly of the outermost region of the working chamber to discharge at least some of the fluid whose level advances in the compartment radially inwardly in response to abrupt rise of fluid pressure in the working chamber and to thereby limit the magnitude of transmitted torque in response to abrupt change in RPM (especially in response to sudden acceleration) of the impeller element. The compartment preferably includes at least one channel extending from the outermost region of the working chamber substantially radially inwardly toward the opening to guide the fluid on its way toward the opening. The channel can be defined by ribs, other types of projections, pockets or other types of recesses provided on and/or in that side of the one section and/or the other element which is adjacent the compartment.

The coupling preferably further comprises a fluid reservoir and means for conveying fluid from the reservoir into the working chamber, preferably at a locus disposed radially inwardly of the outermost region of the chamber. The conveying means may include a pump which draws fluid from the reservoir, a supply conduit which connects the outlet of the pump with the working chamber, and a valve in the supply conduit or other suitable means for regulating the rate of fluid flow from the reservoir into the working chamber. The reservoir preferably surrounds the aforementioned elements of the coupling so that such elements are cooled by the supply of fluid in the reservoir, and at least one of the elements (preferably the casing element) has at least one orifice wherein the fluid flows continuously from the outermost region of the working chamber into the reservoir.

The novel features which are considered as characteristic of the invention are set forth in particular in the appended claims. The improved hydrodynamic coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
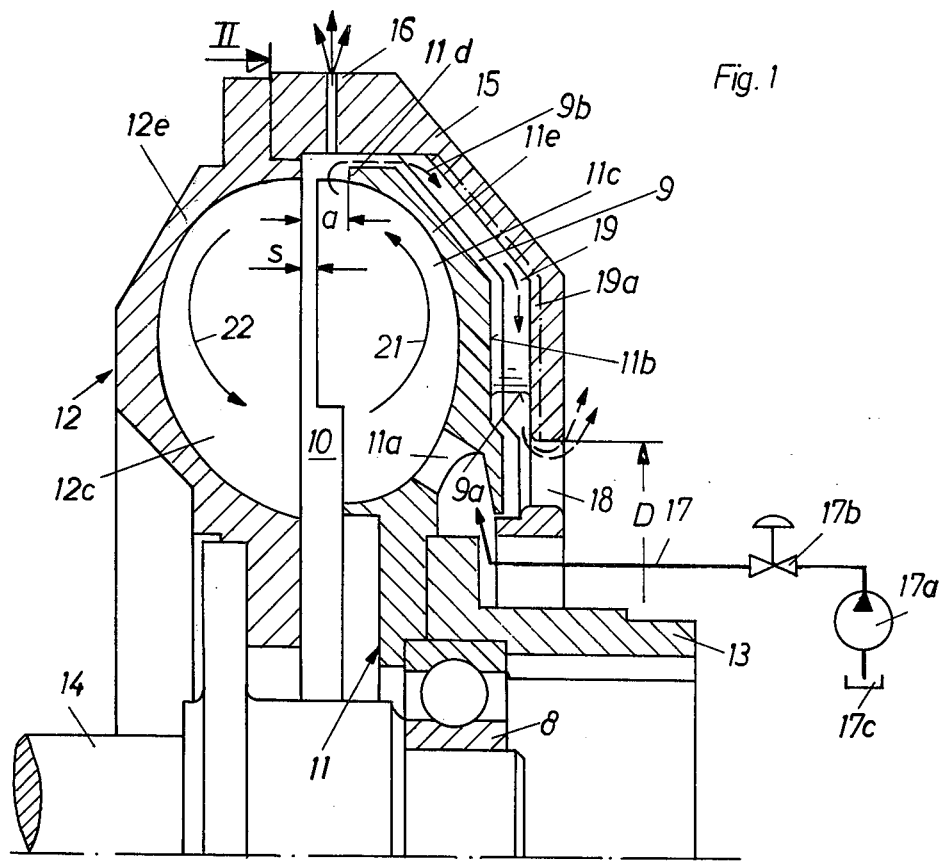
FIG. 1 is a fragmentary axial sectional view of a hydrodynamic fluid coupling which embodies one form of the invention.
Figure 2:
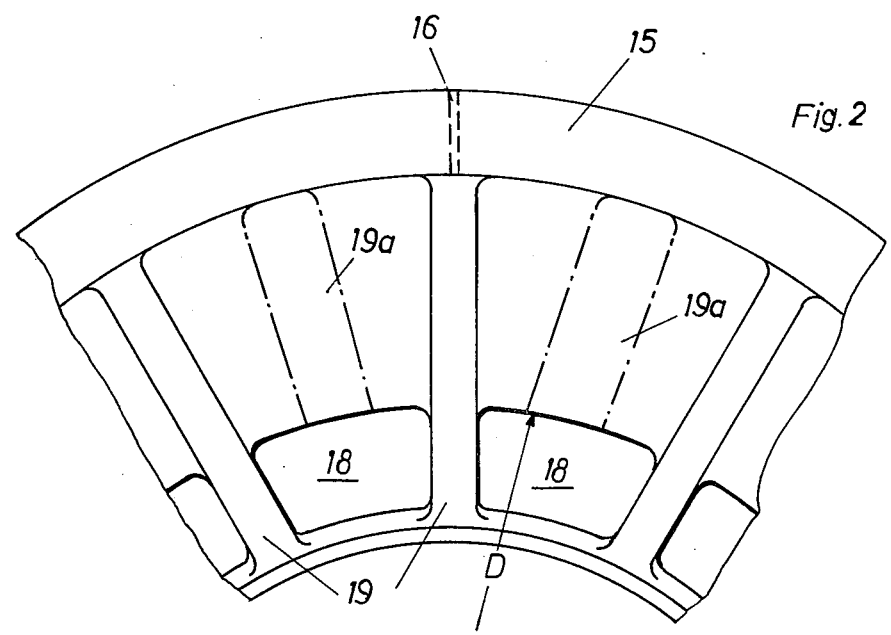
FIG. 2 is an enlarged fragmentary elevational view of the inner side of the casing in the coupling of FIG. 1, as seen in the direction of arrow II.

The hydrodynamic fluid coupling of FIGS. 1 and 2 comprises a bladed impeller 11 which is secured to a hollow drive shaft 13 and a coaxial bladed turbine wheel or runner 12 which is connected to a driven shaft 14. The shaft 13 rotates with the outer race of an antifriction bearing 8 whose inner race surrounds the shaft 14. The runner 12 is further connected to a casing 15 which surrounds the impeller 11. The elements 11 and 12 define a toroidal working chamber or circuit 10 which communicates with a compartment 9 between the impeller 11 and casing 15 by way of a gap $s$ between the blades 11c, 12c of the impeller 11 and runner 12. The width of the gap $s$ equals the distance between the blades 11c, 12c, as considered in the direction of common axis of the impeller 11 and runner 12.

The working fluid is admitted by way of an inlet 11a which communicates with the working chamber 10 close to the common axis of the shafts 12, 14 and is machined into the impeller 11. The inlet 11a is connected with a pump 17a by a supply conduit 17 which contains a regulating valve 17b. The casing 15 is formed with a fluid discharging aperture 16 which can be said to constitute an orifice and admits a continuous jet of fluid into a receptacle or reservoir 17c (symbolically represented below the pump 17a) which surrounds the coupling and from which the pump 7a draws fluid for admission into the supply conduit 17. The reservoir 17c may serve to cool the working fluid of the coupling. In addition, the external circuit for the flow of working fluid from the chamber 10 to the pump 17a and back into the chamber can be used to regulate the slip of the runner 12 relative to the impeller 11. The extent of slip of the runner 12 relative to the impeller 11 can be regulated by the valve 17b and/or by one or more scoops, i.e., by changing the degree to which the chamber 10 is filled with fluid.

In order to insure rapid outflow of a certain amount of fluid from the chamber 10 in response to abrupt acceleration of the impeller 11 (this reduces the magnitude of transmitted torque), the radially innermost portion of the casing 15 is formed with an annulus of relatively large openings 18 which can discharge the fluid from the compartment 9 into the reservoir 17c. The inner side of the casing 15 has several radially extending projections or ribs 19 which divide the compartment 9 into channels wherein the fluid flows from the radially outermost region or zone of the chamber 10 toward and into the discharge openings 18. It has been found that the provision of ribs 19 and openings 18 insures rapid outflow of fluid and resulting partial evacuation of the coupling in response to abrupt rise of fluid pressure in the chamber 10. When such pressure is relatively low, fluid leaves the chamber 10 only through the orifice or orifices 16.

In order to facilitate or promote the flow of fluid from the chamber 10 into the compartment 9, without adversely affecting the operation of the coupling, the blade-supporting concave shell 11e of the impeller 11 is preferably machined to remove some material in the radially outermost region thereof (as at 11d) so that the blades 11c extend axially of the coupling beyond the shell 11e and the distance $a$ between the shell 11e and the shell 12e of the runner 12 exceeds the width of the gap s. The difference between a and s may be in the range of a few millimeters. Such departure from customary design of the impeller (wherein the edge face of the shell is flush with the front edge faces of the impeller blades) has been found to contribute to rapid outflow of fluid when the impeller undergoes a sudden acceleration.

FIG. 2 shows that the evacuation of fluid from the chamber 10 into the openings 18 via compartment 9 can be expedited still further if the inner side of the casing 15 is formed with elongated radially extending pockets 19a which alternate with the ribs 19 but may be narrower than the angular distance between two neighboring ribs. The pockets 19a increase the volume of channels between the ribs 19 and thus contribute to rapid outflow of fluid from the working chamber 10 into the reservoir 17c when the RPM of the impeller 11 suddenly increases.

The directions of fluid flow in the working chamber 10 during normal operation are indicated by the arrows 21 and 22 shown in FIG. 1. The level of fluid in the working chamber 10 and compartment 9 during such normal operation is indicated at 9a. It will be seen that the body of fluid accumulates in the outer region of the chamber 10 but does not reach the openings 18; however, such fluid can flow through the orifice or orifices 16 because they are provided in or close to the radially outermost portion of the casing 15 close to the annular space which connects the chamber 10 with the compartment 9. When the RPM of the impeller 11 increases sufficiently to cause the evacuation of some fluid via openings 18, the fluid flows in the direction indicated by the broken-line arrows 9b.

The spaced-apart ribs 19 and/or pockets 19a in the inner side of the casing 15 can be replaced with an annulus of closely adjacent radially extending ribs and narrow pockets or grooves therebetween. Regardless of the configuration of the inner side of the casing 15, it is advisable and advantageous to provide the outer side of the shell 11e of the impeller 11 with a relatively smooth surface 11b. This insures that, if and when the RPM of the impeller 11 is suddenly increased, the fluid which fills the compartment 9 to the level 9a is not immediately accelerated in the circumferential direction of the coupling but continues to circulate at the previous speed and flows radially inwardly toward the respective openings 18 to be returned into the reservoir 7c. In other words, the pressure of fluid in the compartment 9 remains the same as that determined by centrifugal force during normal operation of the coupling. All this contributes to rapid evacuation of a certain amount of fluid via openings 18.

The fact that the ribs 19 and/or pockets 19a of the casing 15 promote the flow of fluid toward and into the openings 18 has been confirmed in the course of extensive experimentation with the improved coupling. The surprising or unexpected feature is that the fluid exhibits a pronounced tendency to flow toward the openings 18 in spite of the fact that it is in contact with the shell 11e of the rapidly rotating impeller 11 (whose RPM at the time the fluid must flow into the openings 18 exceeds the RPM of the runner 12 and casing 15). As stated above, the effectiveness of the ribs 19 and/or pockets 19a is more pronounced if the outer side of the shell 11e of the impeller is machined to a high degree of smoothness, e.g., by turning, milling, polishing or an analogous technique. On the other hand, the inner side of the casing 15 need not be smooth, e.g., such inner side may have a finish which is customary on castings. In fact, the roughness of the inner side of the casing 15 can be increased on purpose, e.g., by sand blasting or by an analogous procedure.

The present invention is based on the recognition that a rapid rise of fluid pressure in the radially outermost region of the working chamber 10 (as a result of abrupt increase of RPM of the impeller 11) can be utilized to effect rapid evacuation of some fluid from the working chamber in addition to such fluid which is continuously evacuated via orifice or orifices 16. The path or paths along which the fluid is evacuated extends or extend radially inwardly from the outer edge of the shell 11e for the blades 11c of the impeller 11 and along the inner side of the casing 15. It is important to insure that fluid which is to issue from the coupling by way of the openings 18 should not be allowed to flow into the spaces between the blades 12c of the runner 12. This is achieved, in accordance with the invention, by establishing communication between the compartment 9 and the radially outermost region or zone of the chamber 10 so that the fluid level (9a) in the chamber 10 normally equals the fluid level in the compartment 9 but the compartment receives additional fluid as soon as the pressure in the chamber rises to force the liquid level in the compartment to advance radially inwardly and to reach the openings 18 as soon as the pressure of fluid in the chamber reaches a value corresponding to a predetermined acceleration of the impeller. At least the major part of the path for the outflow of fluid via openings 18 should be defined by or provided in the runner 12 and/or casing 15 (which latter rotates with the runner). Otherwise stated, the embodiment which is shown in FIGS. 1 and 2 operates in such a way that the channel or channels for evacuation of fluid in response to sudden rise of fluid pressure in the chamber 10 are bounded, at least to a large extent, by the wall or walls of the secondary element or elements of the coupling. Fluid which is contained in the channel or channels is also subjected to the action of centrifugal forces, the same as the fluid in the working chamber 10, whenever the runner 12 rotates, i.e., the pressure of fluid in the compartment 9 is a function of the magnitude of centrifugal forces. However, when the RPM of the impeller 11 suddenly increases, the RPM of the runner 12 is less, at least for a short interval following rapid acceleration of the impeller. Consequently, the pressure of fluid in the compartment 9, too, remains unchanged (or rises only slightly) during the interval immediately following rapid acceleration of the impeller 11. Therefore, rapid rise of fluid pressure in the working chamber 10 (such rise takes place as soon as the speed of the impeller 11 increases) can effect immediate expulsion of some fluid from the outermost region of the chamber 10, into the compartment 9 and thence into the openings 18. Such expulsion takes place prior to a rise of fluid pressure in the compartment 9 to the pressure prevailing in the working chamber 10.

Another requisite for rapid evacuation of some fluid in response to abrupt acceleration of the impeller 11 is that the coupling provides one or more relatively large paths for the outflow of fluid via openings 18. This can be readily achieved by appropriate dimensioning of channels between the ribs 19 and/or the pockets 19a. As a rule, the capacity of the compartment 9 between the casing 15 and the impeller 11 can be readily selected with a view to permit one or more relatively large fluid streams to flow radially inwardly toward and into the openings 18.

The combined cross-sectional area of all openings 18 is selected in such a way that the openings do not throttle the flow of fluid which surges radially inwardly toward the axis of the coupling in response to abrupt acceleration of the impeller 11.

It is further within the purview of the invention to enlarge the cross-sectional area of the path wherein the fluid flows from the working chamber 10 into the compartment 9 in response to abrupt acceleration of the impeller 11. For example, the shell 11e which carries the blades 11c of the impeller 11 can be provided with one or more holes (not shown) so that the compartment 9 communicates with the outermost region of the chamber 10 (as at 11d) as well as by way of holes in the shell 11e of the impeller 11. However, the holes in the shell of the impeller could adversely affect the output number lambda (i.e., the specific power absorption) of the coupling. As already mentioned, an important prerequisite for satisfactory operation of the coupling, i.e., for limitation of torque in response to abrupt acceleration of the impeller 11, is to insure that the fluid which is to be evacuated via openings 18 can flow into the compartment 9 immediately after it leaves the spaces between the blades 11c of the impeller (or directly from such spaces) without flowing through the spaces between the blades 12c of the runner 12 on its way toward and into the openings 18.

Figure 3:
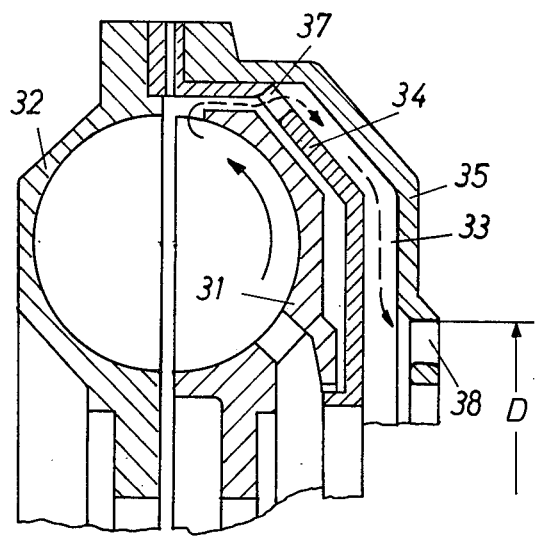
FIG. 3 is a fragmentary axial sectional view of a second coupling.

The coupling of FIG. 3 comprises an impeller 31 and a turbine wheel or runner 32. The single-walled casing 15 of FIGS. 1 and 2 is replaced with a twin-walled casing having sections or walls 34, 35 the latter of which is located at the outer side of the section 34 and defines therewith a compartment 33 wherein working fluid flows from the working chamber or circuit into the openings 38 (corresponding to the openings 18) when the RPM of the impeller 31 suddenly increases. The radially outermost portion of the compartment 33 communicates with the radially outermost region of the working chamber by means of ports 37 which are machines into the inner section 34 of the casing. The number of ports 37 is relatively small, i.e., such ports are spaced apart from each other a considerable distance as considered in the circumferential direction of the section 34. The inner side of the outer section 35 may be configurated in the same or similar way as described in connection with the casing 15 of FIG. 1, i.e., the section 35 may be formed with pockets and/or grooves and ribs which define radially extending channels for the flow of fluid from the ports 37 into the openings 38.

The effectiveness of the coupling of FIG. 3 is even more satisfactory than that of the coupling of FIGS. 1 and 2; however, the manufacturing cost is higher due to the provision of a twin-walled (two-section) casing. Greater effectiveness of the coupling of FIG. 3 is attributable to the fact that the compartment 33 is practically completely separated from the rear side of the shell for the blading of the impeller 31, i.e., that fluid in the compartment 33 is not directly influenced by the RPM of the impeller.

Figure 4:
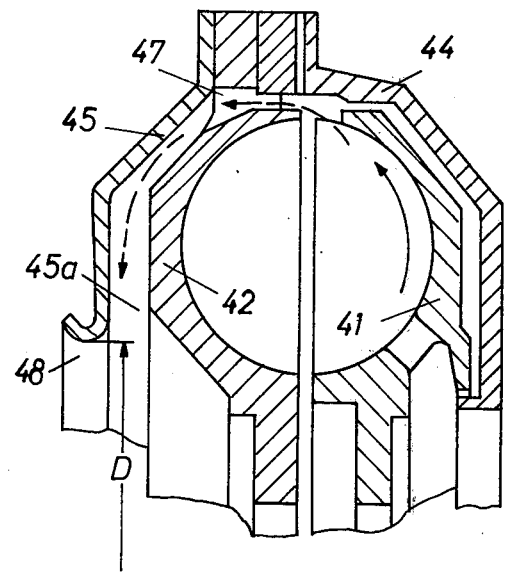
FIG. 4 is a fragmentary axial sectional view of a third coupling.

The coupling of FIG. 4 comprises an impeller 41, a turbine wheel or runner 42 and a casing 44 having a single section which spacedly surrounds the outer side of the impeller shell and is connected to the runner 42. A second casing 45 surrounds the outer side of the runner 42 and is connected thereto. The compartment 45a between the shell of the runner 42 and casing 45 communicates with the working chamber between the impeller 41 and the runner. To this end, the radially outermost portion of the runner 42 is formed with a plurality of ports 47 which enable the fluid to flow from the working chamber into the radially outermost portion of the compartment 45a. The casing 45 is formed with a single centrally located circular opening 48 which discharges fluid into the reservoir (not shown in FIG. 4). However, it is equally within the purview of the invention to replace the single opening 48 with an annulus of several openings. The center of the opening 48 is located on the common axis of the elements 41, 42.

The advantages of the coupling of FIG. 4 are the same as those of the coupling which is shown in FIG. 3. An additional advantage of this embodiment is that fluid flowing from the working chamber into the compartment 45a need not undergo a change in direction which is as pronounced as that in the previously described embodiments.

The opening 48 further serves as a passage through which the shaft (not shown) for the runner 42 extends. Still further, the opening 48 can receive a fixed flange for the conduit (corresponding to the supply conduit 17 of FIG. 1) which admits fluid into the working chamber. As a rule, the coupling will be provided with an annulus of two or more openings such as those shown in FIGS. 1-2 and 3.

Figure 5:
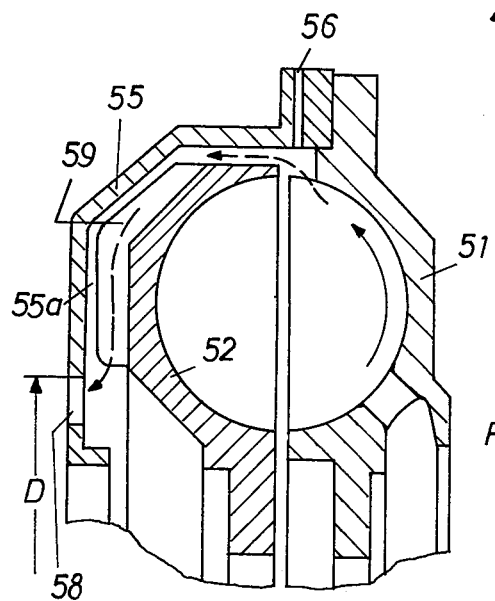
FIG. 5 is a fragmentary axial sectional view of a fourth coupling.

Referring to FIG. 5, there is shown a portion of a fourth coupling having an impeller 51, a turbine wheel or runner 52 and a casing 55 which is secured to the impeller and surrounds the outer side of the runner shell. The orifice 56 (corresponding to the orifice 16 of FIG. 1) is provided in the radially outermost portion of the casing 55. The compartment 55a between the inner side of the casing 55 and the outer side of the shell of the runner 52 can admit fluid into one or more openings 58 (corresponding to the openings 18 or 38 or to the single opening 48) whenever the RPM of the impeller 51 is abruptly increased to a value at which a certain amount of fluid should be permitted to rapidly leave the working chamber. In this embodiment of the coupling, the projections and/or pockets are provided at the outer side of the shell of the runner 52 because the casing 55 shares the angular movement of the impeller 51. FIG. 5 merely shows one of several radially extending ribs 59 which guide the fluid from the region where the compartment 55a communicates with the working chamber toward the respective openings 58. The inner side of the casing 55 is smooth.

In each of FIGS. 1 to 5, the reference character D denotes the maximum diameter of the circle formed by the openings 18, 38, 58 and the maximum diameter of the single centrally located opening 48. The selection of the diameter D determines the maximum torque which can be transmitted by the improved coupling. Thus, the maximum torque is less if the diameter D is larger, and vice versa. As a rule, the diameter D will be determined by experimentation for each size of the coupling and for each desired maximum torque. If desired, the maximum diameter of the opening 48 of FIG. 4 or the diameters D shown in FIGS. 1-2, 3 and 5 can be varied (e.g., by the provision of one or more baffles which can be adjusted radially of the coupling or by the provision of two or more annuli of openings and means for sealing all but one annulus of openings) so as to allow for regulation of the maximum torque.

The embodiment of FIG. 5 shares the aforediscussed advantage of the coupling which is shown in FIG. 4, i.e., the deflection of fluid which flows from the working chamber into the compartment 55a is less pronounced than in the embodiment of FIG. 3.

A comparison of the coupling of FIG. 5 with the couplings of FIGS. 1-4 shows that it is immaterial or practically immaterial whether the casing is connected to the impeller (FIG. 5) or to the runner (FIGS. 1-4). It is preferred, at this time, to secure the casing to the runner so that the casing surrounds the impeller. The reasons for such preference are as follows: In order to start the circulation of fluid from the working chamber into the reservoir in normal operation of the coupling, the radially outermost portion of the casing must be provided with an orifice (16 in FIGS. 1 and 2). The amount of fluid which flows from the chamber into the reservoir via orifice depends on the RPM of the casing. If the coupling is equipped or associated with means (e.g., regulating valve 17b in FIG. 1 or a scoop) which regulates the RPM of the runner by regulating the extent to which the chamber is filled with fluid, a predictable regulation can be achieved with a higher degree of reproducibility and in a simpler way if the casing rotates at the speed of the runner.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. A hydrodynamic coupling comprising coaxial rotary bladed impeller and runner elements defining a toroidal working chamber for working fluid which transmits torque from said impeller element to said runner element, said chamber having a radially outermost region and the magnitude of transmitted torque being dependent on the degree of filling of said chamber with fluid, said torque increasing in response to increasing ratio of RPM of said impeller element to RPM of said runner element whereby the pressure of fluid which circulates in said chamber increases abruptly as a result of abrupt increase of said ratio; and a casing element having at least one section rigid with one of said first mentioned elements and surrounding the other of said first mentioned elements, at least one of the elements including said casing element and said other element defining a compartment in communication with said outermost region of said chamber so that the liquid level in said compartment normally equals approximately the liquid level in said chamber but the liquid level in said compartment advances toward the common axis of said impeller and runner elements in response to abrupt rise of fluid pressure in said chamber, said coupling having at least one opening communicating with said compartment radially inwardly of said outermost region to discharge at least some of the fluid whose level advances in said compartment radially inwardly in response to said abrupt rise of fluid pressure in said chamber and to thereby limit the magnitude of said torque on abrupt change in speed of said impeller element, especially an abrupt increase in RPM of said impeller element.

2. A coupling as defined in claim 1, wherein said opening is provided in said casing element and said compartment includes at least one channel extending from said outermost region of said chamber substantially radially inwardly toward said opening to guide the fluid on its way toward said opening.

3. A coupling as defined in claim 1, further comprising a fluid reservoir and means for conveying fluid from said reservoir into said chamber radially inwardly of said outermost region thereof, at least one of said elements having at least one orifice wherein the fluid flows from said outermost region of said chamber into said reservoir.

4. A coupling as defined in claim 3, wherein said reservoir surrounds said elements, said conveying means including means for regulating the rate of fluid flow from said reservoir into said chamber.

5. A coupling as defined in claim 3, wherein said opening discharges the fluid into said reservoir.

6. A coupling as defined in claim 1, wherein each of said impeller and runner elements comprises a shell for the respective blades, said shells and said blades being respectively spaced apart from each other, as considered in the direction of said axis and the distance between said shells exceeding the distance between said blades.

7. A coupling as defined in claim 6, wherein the blades of one of said impeller and runner elements extend axially of said elements beyond the respective shell.

8. A coupling as defined in claim 1, wherein said one section of said casing element is rigid with said runner element and surrounds said impeller element, said impeller element including a shell having an outer side facing away from said chamber and adjacent said compartment, said one section having an inner side adjacent said compartment.

9. A coupling as defined in claim 8, wherein said inner side of said one section has a plurality of projections disposed in said compartment and extending substantially radially of said impeller element from said outermost region of said chamber toward said opening to guide the fluid on its way toward and into said opening.

10. A coupling as defined in claim 1, wherein said casing element is rigid with said runner element and includes two sections, said one section surrounding said impeller element and the other of said sections spacedly surrounding said one section, said compartment being disposed between said sections and said opening being provided in said casing element.

11. A coupling as defined in claim 1, wherein said one section of said casing element is rigid with and surrounds said runner element, said compartment being disposed between said one section and said runner element.

12. A coupling as defined in claim 11, further comprising a second casing rigid with said runner element and surrounding said impeller element.

13. A coupling as defined in claim 11, wherein said one section of said casing is rigid with said impeller element and said runner element has as outer side adjacent said compartment and having projections extending from said outermost region of said chamber and substantially radially inwardly toward said axis to guide the fluid flowing toward said opening.

14. A coupling as defined in claim 13, wherein said one section has a smooth inner side adjacent said compartment.

15. A coupling as defined in claim 1, wherein said one section is rigid with said runner element and surrounds said impeller element, said impeller element having a smooth outer side facing away from said chamber and being adjacent said compartment.

16. A coupling as defined in claim 1, wherein said opening is a circular opening whose center is located on said axis.

17. A coupling as defined in claim 1, having an annulus of openings in communication with said compartment.

* * * * *